United States Patent [19]

Awaji et al.

[11] Patent Number: 5,153,277

[45] Date of Patent: Oct. 6, 1992

[54] RESIN COMPOSITION

[75] Inventors: Toshio Awaji, Kawanishi; Takao Omi, Nishinomiya; Kenichi Ueda, Suita, all of Japan

[73] Assignee: Nippon Shokubai Kagaku Kogyo Co., Ltd., Osaka, Japan

[21] Appl. No.: 357,543

[22] Filed: May 26, 1989

[30] Foreign Application Priority Data

May 26, 1988 [JP] Japan ............................... 63-126919

[51] Int. Cl.⁵ ............................................. C08L 63/10
[52] U.S. Cl. .................................... 525/502; 525/529; 525/530; 525/531; 525/532
[58] Field of Search ............... 525/529, 502, 530, 531, 525/532

[56] References Cited

U.S. PATENT DOCUMENTS 4,410,680 10/1983 Brownscombe et al. ............. 528/88
4,837,280 6/1989 Awaji et al. ......................... 525/502
4,980,416 12/1990 Awaji et al. ......................... 525/112

OTHER PUBLICATIONS

Chem. Abstract, vol. 83, p. 67, No. 16, (1976)
"Patents Abstract of Japan" vol. 12, No. 103 (1988).
Chem. Abstract, No. 106659w "Epoxy Resin Compositions for prepegs" (1976).
European Search Report, 89305397.5.

Primary Examiner—Robert E. Sellers
Attorney, Agent, or Firm—Omri M. Behr

[57] ABSTRACT

A resin composition useful as a matrix resin for a composite material comprises (A) from 30-80% by weight of an amino group-containing unsaturated ester compound obtained by ring-opening addition reacting an epoxy group-containing unsaturated compound (c) with an aromatic polyamine (a) or diamine (b) in an equivalent weight ratio of compound (c) to amino hydrogen atom of polyamine (a) or diamine (b) of from 0.25-0.9:1, (B) from 10-60% by weight of a polyepoxy compound, and (C) from 5-60% by weight of a radically polymerizable cross-linking agent such as p-methyl styrene.

9 Claims, No Drawings

RESIN COMPOSITION

BACKGROUND OF THE INVENTION

1. Field of the Invention

This invention relates to a resin composition. More particularly, it relates to a resin composition which excels in formability including curing property and workability, produces a cured article excelling in stability at elevated temperatures and in mechanical strength, and when used as a matrix resin for a composite material, exhibits excellent adhesiveness with reinforcing fibers and a highly desirable fatigue-resistant characteristic.

2. Description of the Prior Art

As resins excelling stability at elevated temperatures, various heat-resistant resins represented by polyimide resin and polyamideimide resin may be mentioned. These heat-resistant resins, however, have serious drawbacks in formability as evinced by the fact that must be molded at a high temperature under a high pressure because of their high melting points, they must be cured at a high temperature under a high pressure for a long time, and they must be dissolved in special high-boiling solvents to be used efficiently. It is, therefore, extremely difficult to produce bulky shaped article or to produce article by continuously pultrusion molding or extrusion molding from these heat-resistant resins.

As resins excelling in formability including curing property and workability, such radical polymerization type resins as epoxy (meth)acrylates derived from such polyphenol type epoxy resins as bisphenol epoxy resins and novolac type epoxy resins and (meth)acrylic acids and unsaturated polyesters have been known. Generally, these resins are extensively used as vinyl ester resins or unsaturated polyester resins in a form incorporating therein such a radically polymerizing cross-linking agent as styrene. As resins excelling in adhesiveness with reinforcing fibers or in fatigue-resistant property, various epoxy resins of bis-phenol type and novolac type have been known.

These resins, however, are not necessarily duly satisfactory in terms of thermal stability at elevated temperatures. The insufficiency of thermal stability proves a serious hindrance to the development of applications. In the circumstances, an earnest desire has been expressed to develop a resin possessing notably improved thermal stability.

An object of this invention, therefore, is to provide a novel resin composition.

Another object of this invention is to provide a resin composition which excels in formability including curing property and workability, produces a cured article excelling both in stability at elevated temperatures and in mechanical strength, and, when used as a matrics resin for a composite material, exhibits excellent adhesiveness to reinforcing fibers and highly desirable fatigue-resistant property.

SUMMARY OF THE INVENTION

These objects are accomplished by a resin composition comprising (A) 30 to 80% by weight of an amino group-containing unsaturated ester compound obtained by subjecting (c) a compound represented by the formula III:

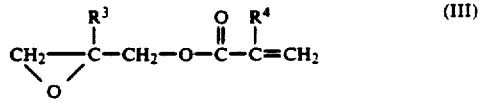

wherein $R^3$ and $R^4$ are independently hydrogen atom or a methyl group and possessing an epoxy group and a radically polymerizable unsaturated bond to a ring-opening addition reaction with at least one aromatic amine selected from the group consisting of (a) an aromatic polyamine represented by the formula I:

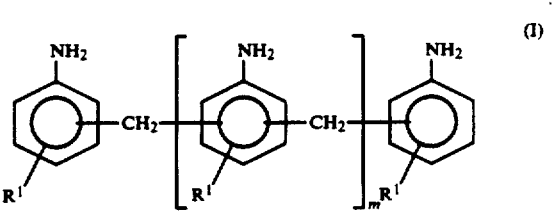

wherein $R^1$ is an atom or an organic group selected from the class consisting of hydrogen atom, halogen atom, methoxy group, and alkyl groups of 1 to 5 carbon atoms and m is an average in the range of 0 to 10, and (b) an aromatic diamine represented by the formula II:

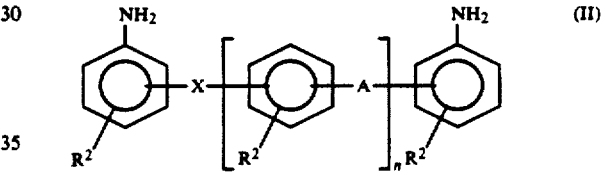

wherein $R^2$ is an atom or an organic group selected from the class consisting of a hydrogen atom, halogen atom, methoxy group, and alkyl groups of 1 to 5 carbon atoms and n is an average in the range of 0 to 10, providing that when n is 0, X is a divalent organic group selected from the class consisting of

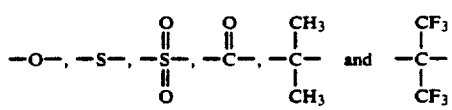

or, when n is an average of more than zero, X and A are independently a divalent organic group selected from the class consisting of

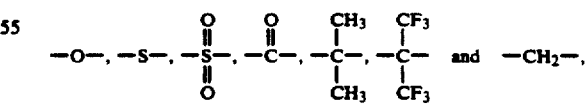

in a ratio in the range of 0.25 to 0.9 equivalent weight of (c) the compound to 1 equivalent weight of the hydrogen atom directly connected to the nitrogen atom contained in the aromatic amine, (B) 10 to 60% by weight of an epoxy compound possessing at least two epoxy groups in the molecular unit thereof, and (C) 5 to 60% by weight of a radically polymerizable cross-linking agent (providing that the total of the compounds of (A), (B), and (C) is 100% by weight).

EXPLANATION OF THE PREFERRED EMBODIMENT

The amino-group-containing unsaturated ester compound (A) to be used in the present invention is obtained by subjecting the compound (c) represented by the formula III to a ring-opening addition reaction with at least one aromatic amine selected from the group consisting of the aromatic polyamines (a) represented by the formula I and the aromatic diamines (b) represented by the formula II in a ratio in the range of 0.25 to 0.9 equivalent weight, preferably 0.4 to 0.8 equivalent weight, to 1 equivalent weight of the hydrogen atom directly connected to the nitrogen atom contained in the aromatic amine.

In the formula I, $R^1$ is an atom or an organic group selected from the class consisting of hydrogen atom, halogen atom, methoxy group, and alkyl groups of 1 to 5 carbon atoms, preferably hydrogen atom and m is an average in the range of 0 to 10, preferably 0 to 5.

In the formula II, $R^2$ is an atom or an organic group selected from the class consisting of hydrogen atom, halogen atom, methoxy group, and alkyl groups of 1 to 5 carbon atoms, preferably hydrogen atom and n is an average in the range of 0 to 10, preferably 0 to 5, providing that when n is 0, X is a divalent organic group selected from the class consisting of

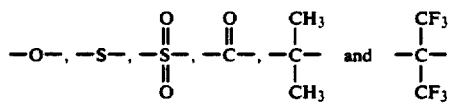

and when n is an average of more than zero, X and A are independently a divalent organic group selected from the class consisting of

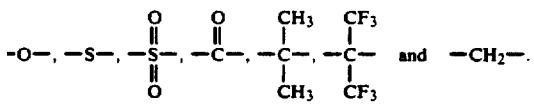

the formula III, $R^3$ and $R^4$ are independently hydrogen atom or methyl group.

In the production of the amino group-containing saturated ester compound (A), if the ratio of the compound (c) to the aromatic polyamine (a) and/or the aromatic diamine (b) is less than 0.25 equivalent weight, the produced amino group-containing unsaturated ester compound is deficient in reactivity with the radically polymerizable cross-linking agent (C). Conversely, if this ratio exceeds 0.9 equivalent weight, the produced compound is deficient in reactivity with the epoxy compound (B). In either case, the target resin composition which excels in formability and produces a cured article excelling both in stability at elevated temperatures and mechanical strength and, when used as a matrix resin for a composite article, exhibits excellent adhesiveness with reinforcing fibers and highly satisfactory fatigue-resistant characteristic is not obtained. Particularly when the ratio is less than 0.25 equivalent weight, the produced resin composition is deficient in formability and incapable of producing a cured article possessing sufficient stability at elevated temperatures. When the ratio exceeds 0.9 equivalent weight, the produced resin composition as a matrix resin for a composite material is deficient in adhesiveness with reinforcing fibers and in fatigue-resistant characteristic.

The aromatic polyamine (a) is a substance represented by the general formula mentioned above and can be obtained by neutralizing an aniline derivative with hydrochloric acid thereby preparing a hydrochloride solution of aniline derivative and causing formaldehyde to react on the hydrochloride solution in a ratio in the range of 0.25 to 1.0 mol of formaldehyde to 1 mol of the aniline derivative. The aniline derivatives which are usable in the production of the aromatic polyamine (a) include aniline, p- (m- or o-)chloroaniline, p- (m- or o-) toluidine, p- (m- or o-) ethylaniline, p- (m- or o-)isopropylaniline, p- (m- or o-)n-propylaniline, and p- (m- or o-)-methoxyaniline, for example. These aniline derivatives may be used either singly or in the form of a mixture of two or more members. The poly(phenylenemethylene) polyamine obtained by the reaction of aniline with formaldehyde is currently manufactured commercially as a raw material for polyurethane. For example, MDA-220 or MDA-150 (both proprietary versions of the poly(phenylenemethylene) polyamine manufactured by Mitsui-Toatsu Chemical Inc.) are usable in its unmodified form as the aromatic polyamine (a) in the present invention.

The aromatic diamine (b) is a substance represented by the general formula mentioned above. The aromatic diamines which are usable herein include 4,4'-diaminodiphenylsulfide, 4,4'-diaminodiphenylsulfone, 3,3'-diaminodiphenylsulfone, 3,4'-diaminodiphenyl ether, 4,4'-diaminodiphenyl ether, 2,2-bis(4-aminophenyl)propane, 2,2-bis(4-aminophenyl)hexafluoropropane, 1,3-bis(4-aminophenoxy)benzene, 1,4-bis(4-aminophenoxy)benzene, 1,3-bis(3-aminophenoxy)benzene, 2,2-bis[4-(4-aminophenoxy)phenyl]propane, bis[4-(4-aminophenoxy)phenyl]sulfone, 1-(p-aminobenzoyl)-4-(p-aminobenzyl)benzene, 1-(p-aminobenzoyl)-4-(m-aminobenzyl)benzene, 1-(m-aminobenzoyl)-4-(p-aminobenzyl)benzene, 1-(m-aminobenzoyl)-4-(m-aminobenzyl)benzene, 1,4-bis(m-aminobenzoyl)benzene, 1,4-bis(p-aminobenzoyl)benzene, 1,3-bis(m-aminobenzyl)benzene, 4,4'-bis(m-aminobenzoyl)diphenylmethane, 4,4'-bis(p-aminobenzoyl)diphenylmethane, 4,4'-bis(m-aminobenzyl)diphenylmethane, and the foregoing compounds having the aromatic hydrogen atoms substituted with halogen, methoxy group, or an alkyl group of 1 to 5 carbon atoms. These aromatic diamines may be used either singly or in the form of a mixture of two or more members.

The compound (c) is a substance possessing an epoxy group and a radically polymerizable unsaturated bond as represented by the general formula mentioned above. The compounds which are usable herein include glycidyl methacrylate, glycidyl acrylate, 2-methylglycidyl methacrylate, and 2-methylglycidyl acrylate, for example. These compounds may be used either singly or in the form of a mixture of two or more members.

The ring-opening addition reaction of the compound (c) with the aromatic polyamine (a) and/or the aromatic diamine (b) is accomplished by mixing these compounds in the ration of reaction mentioned above in an inactive solvent or in the absence of any solvent and heating them at a temperature in the range of 30° to 150° C., preferably 50° to 130° C., preferably in the presence of air. For the purpose of preventing the reaction from inducing gelation due to polymerization, it is preferable to use a well-known popularly used polymerization inhibitor. Examples of the well-known polymerization inhibitor include hydroquinones such as methyl hydroquinone and hydroquinone and benzoquinones such as p-benzoquinone and p-toluquinone. The amount of the polymerization inhibitor to be used is in the range of 0.001 to 0.5% by weight, preferably 0.005 to 0.2% by weight, based on the amount of the aromatic amine mentioned above.

Optionally, a ring-opening addition catalyst may be used in the reaction for the purpose of shortening the reaction time. The ring-opening addition catalysts which are usable herein include water; alcohols such as methyl alcohol, ethyl alcohol, and isopropyl alcohol; phenols such as phenol and t-butyl catechol; organic acids such as salicylic acid, citric acid, and malic acid; organic acid salts such as zinc salicylate and tin octylate; boron trifluoride-monoethanol amine complex; and amines such as triethylamine and dimethylbenzylamine. The amount of the ring-opening addition catalyst to be used herein is in the range of 0.01 to 3.0% by weight, preferably 0.05 to 2.0% by weight, based on the amount of the aromatic amine.

Toluene, xylene, or dimethyl formamide, for example, is usable as the inert solvent. The solvent, however, must be removed from the reaction solution after the reaction. When a radically polymerizable cross-linking agent which is in a liquid state at normal room temperature is to be additionally used particularly in the final composition, it is desirable to use this radically polymerizable cross-linking agent as a solvent instead.

Examples of the epoxy compound (B) possessing at least two epoxy groups in the molecular unit thereof and used in the present invention (hereinafter referred to briefly as "epoxy compound (B)") include bisphenol epoxy resins represented by the formula IV:

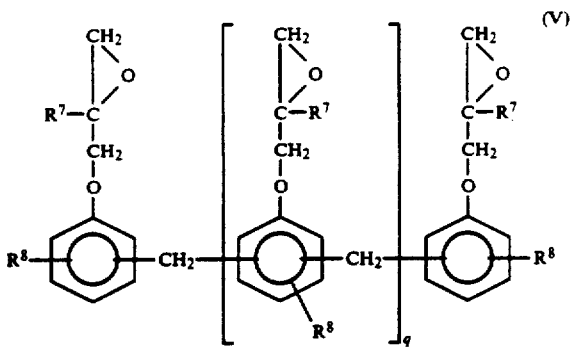

wherein $R^7$ is hydrogen atom or methyl group, $R^8$ is independently a hydrogen atom or an alkyl group, and q is an average in the range of 1 to 15; glycidylamine epoxy resins such as triglycidyl-p-aminophenol, triglycidyl-m-aminophenol, N-tetraglycidyl-diaminodiphenylmethane, and polyglycidyl meta-xylylene diamine; isocyanuric acid epoxy resins such as triglycidyl isocyanurate; tetrahydroxyphenyl ethane epoxy resins; hydantoin epoxy resins; and alicyclic epoxy resins. These epoxy compounds (B) may be used either singly or in the form of a mixture of two or more members. As commercially available versions of the epoxy compounds (B), Araldite GY250, Araldite GY260, Araldite 6071, Araldite 8011, EPN1138, EPN1139, ECN1235, ECN1273, ECN1280, ECN1299, and Araldite MY720 produced by Ciba Geigy; Epikote 828, Epikote 1001, and Epikote 1004 produced by Shell Chemical Co.; D.E.R. 330, D.E.R. 331, D.E.R. 662, D.E.R. 542, D.E.N. 431, and D.E.N. 438 produced by the Dow Chemical Company; and Epototo YD-127, Epototo YD-011, Epototo YDB-400, Epototo YDB-500, Epototo YDF-170, Epototo YDF-2001, YDCN-701, YDCN-702, YDCN-703, YDCN-704, YDPN-638, YDPN-601, YDPN-602, YDM-120, YH-434, and ST-110 produced by Toto Kasei Co., Ltd. may be mentioned, for example. Further, glycidyl ethers of condensates of unsaturated aldehydes with phenols, adducts of epoxy compounds possessing an average of two or more epoxy groups in the molecular unit thereof to polyphenol compounds, and glycidyl ether compounds of polycondensates of polyphenols with monophenols are other examples of the epoxy compound (B). The epoxy compounds (B) which are usable in the present invention are not limited to the epoxy compounds enumerated above. They are only required to be epoxy compounds containing an average of at least two epoxy groups in the molecular unit thereof. These epoxy compounds may be used either singly or in the form of a mixture of two or more members.

In the various epoxy compounds (B) mentioned above, those which have epoxy equivalents in the range of 100 to 1,000 prove particularly preferable from the standpoint of the thermal stability to be acquired by a (IV)

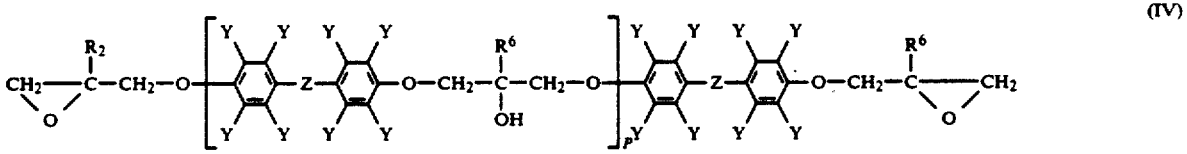

wherein Z is an alkylene group of 1 to 4 carbon atoms,

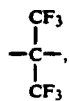

$SO_2$, S or O, $R^6$ is hydrogen atom or methyl group, Y is a hydrogen atom or halogen atom, and p is an average in the range of 0 to 15; novolac epoxy resins represented by the formula V:

duced shaped article of the resin composition to be produced.

The radically polymerizable cross-linking agents (C) which are usable in the present invention include styrene derivatives such as styrene, α-methyl styrene, chlorostyrene, and divinylbenzene; (meth)acrylic acid ester monomers such as methyl (meth)acrylate, 2-ethylhexyl (meth)acrylate, cyclohexyl (meth)acrylate, tricyclodecenyl (meth)acrylate, and 2-hydroxyethyl (meth)acrylate; (meth)acrylate of polyhydric alcohol such as trimethylol propane tri(meth)acrylate, diethylene glycol di(meth)acrylate, 1,4-butanediol di(meth)acrylate, tri(2-hydroxyethyl)isocyanuric acid (meth)acrylic esters, and di(meth)acrylate of 2,2-bis[4-(2-hydroxyethoxy)phenyl]propane; allyl compounds such as diallyl phthalate, diallyl isophthalate, diallyl terephthalate, diallyl isocyanurate, and triallyl cyanurate. These radically polymerizable cross-linking agents (C) may be used either singly or in the form of a mixture of two or more members.

Among other radically polymerizable cross-linking agents (C) mentioned above, alkyl-substituted styrene derivatives represented by the formula VI:

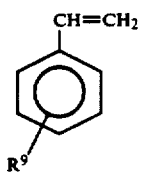

(VI)

wherein $R^9$ is an alkyl group of 1 to 5 carbon atoms, prove particularly preferable in the sense that the cured shaped articles of the produced resin composition are excellent in stability at elevated temperatures.

The alkyl-substituted styrene derivatives which are usable herein include o- (m- or p-)methyl styrene, o- (m- or p-)ethyl styrene, o- (m- or p-)isopropyl styrene, o- (m- or p-)n-propyl styrene, o- (m- or p-)n-butyl styrene, and o- (m- or p-)t-butyl styrene, for example. These alkyl-substituted styrene derivatives may be used either singly or in the form of a mixture of two or more members.

The mixing ratio of the amino group-containing unsaturated ester compound (A), the epoxy compound (B), and the radically polymerizable cross-linking agent (C) is preferable to be fixed arbitrarily at the optimum value in consideration of the amount of the hydrogen atom directly connected to the nitrogen atom in the amino group-containing unsaturated ester compound (A) and the epoxy equivalent of the epoxy compound (B), for example. From the standpoint of the formability of the resin composition to be produced and the stability of the cured shaped article of the resin composition at elevated temperatures, this mixing ratio is desired to be such that the proportion of the amino group-containing unsaturated ester compound (A) is in the range of 30 to 85% by weight, preferably 30 to 70% by weight, that of the epoxy compound (B) in the range of 10 to 60% by weight, preferably 15 to 50% by weight, and that of the radically polymerizable cross-linking agent (C) in the range of 5 to 60% by weight, preferably 10 to 50% by weight (providing that the total of (A), (B), and (C) is 100% by weight).

If the proportions of the amino group-containing unsaturated ester compound (A) and the radically polymerizable cross-linking agent (C) are smaller than the lower limits of the respective ranges mentioned above, the resin composition acquires no sufficient formability and the cured shaped article of the resin composition acquires no stability at elevated temperatures. If the proportions are increased beyond the upper limits of the ranges, the properties mentioned above are not proportionately increased and conversely the produced resin composition becomes deficient in adhesiveness with reinforcing fibers or in fatigue-resistant characteristic. If the proportion of the epoxy compound (B) is less than 10% by weight, the produced resin composition, when used as a matrix resin for a composite material, exhibits insufficient adhesiveness with the reinforcing fibers and poor fatigue-resistant characteristic. If the proportion of the epoxy compound (B) is increased beyond 60% by weight, the produced resin composition is deficient in formability and the cured shaped article of the resin composition tends to be deficient in stability at elevated temperatures.

The curing of the resin composition of the present invention is accomplished by the progress of two reactions, i.e. the reaction of radical polymerization of an ethylenically unsaturated bond and the reaction of ring opening of an epoxy group with the active hydrogen. Specifically, this curing may be carried out by the procedure of performing the reaction of radical polymerization and subsequently the reaction with the epoxy group, the procedure of performing simultaneously the reaction of radical polymerization and the reaction with the epoxy group, or the procedure of performing first the reaction with the epoxy group and subsequently the reaction of radical polymerization, for example.

The reaction of radical polymerization can be initiated by the method of photopolymerization with a photosensitizer, the method of thermal polymerization with an organic peroxide or an azo compound, or the method of normal temperature polymerization with an organic peroxide and a promoter, for example.

The photosensitizers which are usable for the method of photopolymerization include various known compounds such as carbonyl compounds represented by benzoin, benzoin methyl ether, benzoin ethyl ether, benzoin propyl ether, benzoin isobutyl ether, and benzophenone and sulfur compounds represented by diphenyl disulfide and tetramethyl thiuram disulfide, for example. These photosensitizers may be used either singly or in the form of a mixture of two or more members. The amount of the photosensitizer to be used is in the range of 0.1 to 4% by weight, preferable 0.5 to 3% by weight, based on the amount of the resin composition.

The organic peroxides which are usable for the thermal polymerization include t-butylperoxy benzoate, t-butylperoxy-2-ethylhexanoate, benzoylperoxide, cyclohexanone peroxide, methylethyl ketone peroxide, acetoacetic ester peroxide, and bis-4-t-butylcyclohexylperoxy dicarbonate, for example. The azo compounds which are usable include such known azo compounds as azobisisobutylonitrile, for example. These compounds may be used either singly or in the form of a mixture of two or more members. The amount of these compounds to be used for the thermal polymerization is in the range of 0.1 to 4% by weight, preferably 0.5 to 3% by weight, based on the amount of the resin composition.

The promoters which are usable in the normal temperature polymerization include polyvalent metal salts such as octylates and naphthenates of cobalt, iron, and manganese, and organic amines such as dimethyl aniline, diethyl aniline, p-toluidine, and ethanol amine. They may be used either singly or in the form of a mixture of two or more members. The amount of the promoter to be used is desired to be in the range of 0.01 to 3% by weight, preferably 0.1 to 2% by weight. Though the curing reaction with an epoxy group is sufficiently attained by heating alone, it may be carried out, when necessary, in the presence of a reaction promoter. The reaction promoters which are usable for this purpose include organic acids such as salicyclic acid, citric acid, and malic acid and organic acid salts such as zinc salicylate and tin octylate, for example. The amount of the reaction promoter to be used is desired to be in the range of 0.01 to 3% by weight, preferably 0.1 to 2% by weight.

The resin composition of the present invention may incorporate therein reinforcing materials such as glass fibers, carbon fibers, Alamides fibers, and whiskers, powdery reinforcing agent, filler, thickening agent, silane coupling agents such as acryl silane and epoxy silane, mold release agents such as calcium stearate and paraffin, pigment and coloring agent, and flame retardant and nonflammable agent as occasion demands. It may incorporate, when desired, a thermoplastic resin and an elastomer therein in amounts incapable of obstructing the objects of this invention.

The resin composition of this invention exhibits as high formability including curing property and workability as the conventional radically curing compositions of unsaturated polyester resins and vinyl ester resins and, at the same time, produces a cured shaped article excelling in thermal stability at elevated temperatures and, when used as a matrix resin for a composite material, exhibits excellent adhesiveness with reinforcing fibers and highly satisfactory fatigue-resistant quality. Owing to these advantages, the resin composition of this invention is useful as a resin for the production by the contact molding method or the filament winding method of a bulky shaped article excelling in stability at elevated temperatures, as a resin for the production by the extrusion molding method, the pultrusion molding method, or the highly productive continuous method of a laminate sheet excelling in stability at elevated temperatures, and as a resin for the production of a sheet molding compound (SMC) or bulk molding compound (BMC) by a method featuring shortness of a molding cycle. The typical applications in which the resin composition of this invention finds utility include automobile parts such as leaf springs, drive shafts, and wheels, electric and electronic parts such as printed-circuit boards and various insulating parts, aircraft parts such as jet engine parts, covering materials for optical fiber cables, cast molding resins for electric and electronic parts, and coating resins such as coating varnishes and inks, for example. These are not the only applications found for the resin composition.

Now, the present invention will be described more specifically below with reference to working examples and comparative experiments. It should be noted, however, that the present invention is not limited to the following examples. Wherever the term "parts" is mentioned, it invariably refers to "parts by weight."

EXAMPLE 1

In a reaction vessel provided with a thermometer, a reflux condenser, an air blow inlet tube, and a stirrer, 198 parts (1 mol) of diaminodiphenyl methane, 284 parts (2 mols) of glycidyl methacrylate, 260 parts of vinyl toluene, 0.37 part of hydroquinone, and 1.8 parts of triethylamine were placed, stirred and heated under a current of air at 110° C. for five hours, and tested with the nuclear magnetic resonance absorption spectrum of a sample to confirm completion of the reaction of glycidyl methacrylate. Consequently, a vinyl toluene solution of an amino group-containing unsaturated ester compound (1) was obtained.

A resin composition (1) was obtained by mixing 70 parts of the vinyl toluene solution of amino group-containing unsaturated ester compound (1) with 30 parts of Araldite MY 720 (N-tetraglycidyl diaminodiphenyl methane having an epoxy equivalent of 125, produced by Ciba Geigy).

EXAMPLE 2

In the same reaction vessel as used in Example 1, a styrene solution of an amino group-containing unsaturated ester compound (2) was obtained by following the procedure of Example 1, excepting 260 parts of styrene was used in the place of 260 parts of vinyl toluene.

A resin composition (2) was obtained by mixing 75 parts of the styrene solution of the amino group-containing unsaturated ester compound (2) with 25 parts of Araldite GY250 (bisphenol A epoxy resin having an epoxy equivalent of 185, produced by Ciba Geigy).

EXAMPLE 3

In the same reaction vessel as used in Example 1, 200 parts of polymethylene polyaniline having an amino content of 15.8% (produced by Mitsui Toatsu Chemicals Inc. and marketed under product code of "MDA-150") represented by the following formula:

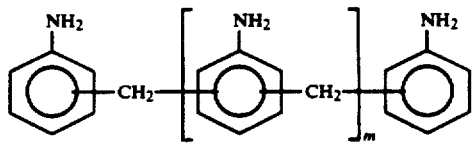

wherein m stands for an average value of 0.8, 336 parts (2.37 mols) of glycidyl methacrylate, 290 parts of p-methyl styrene, 0.65 part of methyl hydroquinone, and 2.1 parts of zinc salicylate were placed, stirred and heated under a current of air at 110° C. for seven hours, and tested with the nuclear magnetic resonance absorption spectrum of a sample to confirm completion of the reaction of glycidyl methacrylate. Consequently, a p-methyl styrene solution of an amino group-containing unsaturated ester compound (3) was obtained.

A resin composition (3) was obtained by mixing 75 parts of the p-methyl styrene solution of the amino group-containing unsaturated ester compound (3) with 25 parts of Araldite GY250 (bisphenol A epoxy resin having an epoxy equivalent of 185, produced by Ciba Geigy).

EXAMPLE 4

In the same reaction vessel as used in Example 1, 200 parts of the same polymethylene polyaniline (produced by Mitsui Toatsu Chemicals, Inc. and marketed under product code of "MDA-150") as used in Example 3, 252 parts (1.78 mols) of glycidyl methacrylate, 243 parts of p-methyl styrene, 0.35 part of methyl hydroquinone, and 2.0 parts of zinc salicylate were placed, stirred and ted under a current of air at 110° C. for five hours, tested with the nuclear magnetic resonance absorption spectrum of a sample to confirm completion of the ction of glycidyl methacrylate. Consequently, a p-:hyl styrene solution of an amino group-containing aturated ester compound (4) was obtained.

ι resin composition (4) was obtained by mixing 65 ts of the p-methyl styrene solution of the amino up-containing unsaturated ester compound (4) with arts of phenol novolac epoxy resin having an epoxy ivalent of 178 (produced by Toto Kasei Co., Ltd. marketed under product code of "YDPN638").

EXAMPLE 5 n the same reaction vessel as used in Example 1, 205 ts (0.5 mol) of 2,2-bis[4-(4-aminophenoxy)phenyl]-pane, 142 parts (1.0 mol) of glycidyl methacrylate, parts of p-methyl styrene, 0.27 part of hydroqui-ιe, and 1.6 parts of zinc salicylate were placed, red and heated under a current of air at 115° C. for : hours, and tested with the nuclear magnetic resoice absorption spectrum of a sample to confirm comion of the reaction of glycidyl methacrylate. Consently, a p-methyl styrene solution of an amino grouptaining unsaturated ester compound (5) was obied.

ι resin composition (5) was obtained by mixing 80 ts of the p-methyl styrene solution of the amino up-containing unsaturated ester compound (5) with arts of phenol novolac epoxy resin having an epoxy ivalent of 178 (produced by Toto Kasei Co., Ltd. marketed under product code of "YDPN 638").

CONTROL 1 n the same reaction vessel as used in Example 1, 198 ts (1.0 mol) of diaminodiphenyl methane, 398 parts mols) of glycidyl methacrylate, 320 parts of vinyl ιene, 0.45 part of hydroquinone, and 2.3 parts of thyl amine were placed, heated at 110° C. for six rs, and tested with the nuclear magnetic resonance orption spectrum of a sample to confirm completion he reaction of glycidyl methacrylate. Consequently, ınyl toluene solution of an amino group-containing aturated ester compound was obtained. This prod- was used as a resin composition (1) for comparison taining no epoxy compound.

CONTROL 2

ιn acetone solution of a resin composition (2) for ıparison, a conventional epoxy resin composition, ι obtained by mixing 100 parts of phenol novolac ιxy resin having an epoxy equivalent of 178 (proed by Toto Kasei Co., Ltd. and marketed under duct code of "YDPN638"), 28 parts of diaminodinyl methane, and 30 parts of acetone.

CONTROL 3

ιn acetone solution of a resin composition (3) for ıparison a conventional epoxy resin composition, ι obtained by mixing 100 parts of bisphenol epoxy n having an epoxy equivalent of 185 (produced by a Geigy and marketed under product code of "Aral-: GY 250"), 27 parts of diaminodiphenyl methane, 30 parts of acetone.

EXAMPLE 6 atin weave glass cloths, 20-cm square, (produced by an Glass Fiber Co., Ltd. and marketed under product code of "YES-2101-N-1") were impregnated with a thorough mixture of 100 parts of a varying resin composition, selected from among the resin compositions (1) to (5) obtained in Examples 1 to 5 and the resin composition (1) for comparison obtained in Control 1, with 1 part of t-butylperoxy-2-ethylhexanoate. A laminate sheet having a glass content of $65\pm1\%$ and a thickness of 3 mm was obtained by laminating 12 impregnated glass cloths and pressing them under 25 kg/cm$^2$ at 120° C. for 10 minutes. The laminated sheets thus obtained were further after-cured at 180° C. for two hours and used for evaluation of thermal stability and evaluation of fatigue-resistant characteristic.

Satin-weave glass cloths, 20-cm square (produced by Japan Glass Fiber Co., Ltd. and marketed under product code of "YES-2101-T") were impregnated with each of the acetone solutions of the resin compositions (2) and (3) for comparison obtained in Controls 2 and 3. They were dried at room temperature for 12 hours, and then further dried at 120° C. for three minutes, to produce prepregs. A laminated sheet having a glass content of $65\pm1\%$ and a thickness of 3 mm was obtained by laminating 12 prepregs and pressing them under 25 kg/cm$^2$ at 180° C. for two hours. The laminated sheets thus obtained were after-cured at 200° C. for seven hours and used for evaluation of thermal stability and evaluation of fatigue-resistant characteristic.

The results of the evaluation are collectively shown in Table 1.

The evaluation of thermal stability was carried out by preparing a test piece of laminate 75 mm × 25 mm × 3 mm and determining the ratio of weight loss by heating and the ratio of bending strength retention after heating in accordance with the following formulas.

The test for bending strength was carried out by using the method of JIS K 6911, with necessary modifications.

Ratio of weight loss by heating (%) =

$$\left\{ 1 - \frac{\text{(Weight of test piece after 500 hours' heating in air at 240° C.)} - \text{(Weight of glass fibers)}}{\text{(Initial weight of test piece)} - \text{(Weight of glass fibers)}} \right\} \times 100$$

The weight of glass fibers was determined by heating the test piece at 240° C. for 500 hours in the air and further heating it at 600° C. for five hours.

Ratio of bending strength retention (%) =

$$\frac{\text{Bending strength after 500 hours' heating in air at 240° C.}}{\text{Initial bending strength}} \times 100$$

The evaluation of the fatigue-resistant characteristic was carried out by preparing a test piece of laminate sheet 140 mm × 40 mm × 3 mm, applying a load on the test piece in a bending fatigue tester (produced by Tokyo Testing Machine Manufactory, Ltd. and marketed under product code of "SVF-500B") under the conditions of three-point bending, 5 Hz, 115 mm of span, and 30 kg/mm$^2$ of repeating stress, and taking count of the repetitions required for the amplitude to increase by 20% from the initial value.

TABLE 1

| Resin composition used for manufacture of laminate sheet | Resin composition | | | | | Resin Composition for comparison | | |
|---|---|---|---|---|---|---|---|---|
| | (1) | (2) | (3) | (4) | (5) | (1) | (2) | (3) |
| Ratio of weight loss (%) after 500 hours' heating in air at 240° C. | 7.4 | 13.8 | 7.0 | 6.7 | 5.4 | 8.2 | 19.1 | 28.5 |
| Ratio of bending strength retention (%) after 500 hours' heating in air at 240° C. | 96 | 62 | 98 | 98 | 99 | 94 | 15 | 8 |
| Fatigue-resistant characteristic: Number of repetitions required for amplitude to increase by 20% initial value | 9384 | 8745 | 10169 | 8248 | 11875 | 2892 | 11029 | 13562 |

What is claimed is:

1. A resin composition comprising (A) 30 to 80% by weight of an amino group-containing unsaturated ester compound obtained by subjecting (c) a compound represented by the formula III:

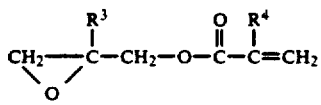

wherein $R^3$ and $R^4$ are independently hydrogen atom or methyl group, and possessing an epoxy group and a radically polymerizable unsaturated bond to a ring-opening addition reaction with at least one aromatic amine selected from the group consisting of (a) an aromatic polyamine represented by the formula I:

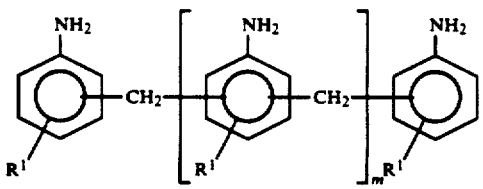

wherein $R^1$ is an atom or an organic group selected from the group consisting of hydrogen atom, halogen atom, methoxy group, and alkyl groups of 1 to 5 carbon atoms and m is an average in the range of 0 to 10, and (b) an aromatic diamine represented by the formula II:

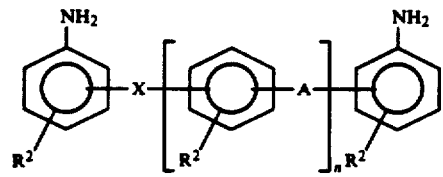

wherein $R^2$ is an atom or an organic group selected from the group consisting of hydrogen atoms, halogen atom, methoxy group, and alkyl groups of 1 to 5 carbon atoms and n is an average in the range of 0 to 10, providing that when n is O, X is a divalent organic group selected from the class consisting of

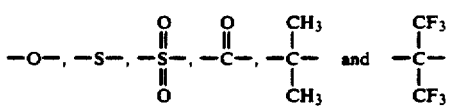

or, when n is an average of more than zero, X and A are independently a divalent organic group selected from the group consisting of

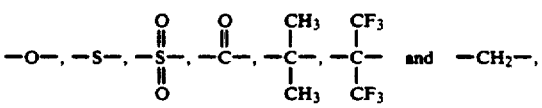

in a ratio in the range of 0.25 to 0.9 equivalent weight of said compound (c) to 1 equivalent weight of the hydrogen atom directly connected to the nitrogen atom contained in said aromatic amine, (B) 10 to 60% by weight of an epoxy compound possessing at least two epoxy groups in the molecular unit thereof, and (C) 5 to 60% by weight of a radically polymerizable cross-linking agent (providing that the total of said compounds of (A), (B), and (C) is 100% by weight).

2. A composition according to claim 1, wherein said amino group-containing unsaturated compound (A) is obtained by subjecting said compound (c) to said ring-opening addition reaction in a ratio in the range of 0.4 to 0.8 equivalent weight to 1 equivalent weight of the hydrogen atom directly connected to the nitrogen atom contained in said aromatic amine.

3. A composition according to claim 1, wherein the epoxy equivalent of said epoxy compound (B) is in the range of 100 to 1,000.

4. A composition according to claim 3, wherein said epoxy compound (B) is at least one member selected from the group consisting of bisphenol epoxy resin, novolac epoxy resin, glycidyl amine epoxy resin, isocyanuric acid epoxy resin, tetrahydroxyphenyl ethane epoxy resin, hydantoin epoxy resin, and alicyclic epoxy resins.

5. A composition according to claim 1, wherein said radically polymerizable cross-linking agent (C) is an alkylsubstituted styrene derivative represented by the formula VI:

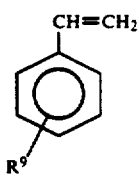

wherein $R^9$ is an alkyl group of 1 to 5 carbon atoms.

5. A composition according to claim 1, which comprises (A) 30% to 70% by weight of said amino group-containing unsaturated ester compound, (B) 15% to 50% by weight of said epoxy compound, and (C) 10% to 50% by weight of said radically polymerizable cross-linking agent.

7. A composition according to claim 4, wherein said epoxy compound (B) is a bisphenol epoxy resin or a novolac epoxy resin.

8. A composition according to claim 4, wherein said epoxy compound (B) is a glycidyl amine epoxy resin.

9. A composition according to claim 1, wherein said formula I has a hydrogen atom for $R^1$ and an average in the range of 0 to 5 for m and said formula II has a hydrogen atom for $R^2$ and an average in the range of 0 to 5 for n.

* * * * *